United States Patent
Cassidy

[15] 3,663,757

[45] May 16, 1972

[54] ELECTROACOUSTIC CONVERTER

[72] Inventor: Carl R. Cassidy, Hatboro, Pa.

[73] Assignee: Burroughs Corporation, Detroit, Mich.

[22] Filed: Nov. 12, 1969

[21] Appl. No.: 875,697

[52] U.S. Cl. ........................................................179/2 DP
[51] Int. Cl. ........................................................H04m 11/06
[58] Field of Search......................179/1 C, 1 CN, 2 C, 2 DP

[56] References Cited

UNITED STATES PATENTS

| | | | |
|---|---|---|---|
| 3,507,997 | 4/1970 | Weitbrecht | 178/66 |
| 3,515,806 | 6/1970 | Spraker | 179/2 |

OTHER PUBLICATIONS

Linking Data to Telephones, Acoustically, Bell Laboratory Record, September 1969, p. 266–270.

*Primary Examiner*—Kathleen H. Claffy
*Assistant Examiner*—Horst F. Brauner
*Attorney*—Paul W. Fish, Edward J. Feeney, Jr. and Charles S. Hall

[57] ABSTRACT

This converter enables the transmission of digital data over a standard telephone by means of a pair of audible tones. It can be used to couple a terminal machine such as a teletypewriter, with a computer at a distant location, using ordinary dial-up voice-grade telephone lines. It can be considered to be a coupler, a converter or an adapter. Functionally, it receives electrical pulses at its input, and converts them to audible tones at its output. There is, of course, no wiring connection required between the converter and the telephone itself.

7 Claims, 18 Drawing Figures

INVENTOR.
CARL R. CASSIDY
BY Edward J. Feeney Jr.
ATTORNEY

INVENTOR.
CARL R. CASSIDY
BY Edward J. Feeney Jr.
ATTORNEY

INVENTOR.
CARL R. CASSIDY

BY Edward J. Feeney Jr.
ATTORNEY

INVENTOR.
CARL R. CASSIDY
BY Edward J. Feeney Jr.
ATTORNEY

INVENTOR.
CARL R. CASSIDY
BY Edward J. Feeney Jr.
ATTORNEY

INVENTOR.
CARL R. CASSIDY
BY Edward J. Feeney Jr.
ATTORNEY

ELECTROACOUSTIC CONVERTER

BACKGROUND OF THE INVENTION

1. Field of the Invention

The present invention relates to the field of adaptive devices which are used to interface a computer or a data processing system with existing telephone transmission lines. Such devices find special use in the area of computer time sharing. This is the field wherein a single, usually large, data processing system is centrally located and a plurality of users at various remote locations have access to the computer on a sequential basis via a terminal device. Each of the users requires as a terminal unit some form of peripheral device which is interfaced to the computer via a plurality of telephone lines. One well known type of such device is referred to as a data set. Due to the fact that these units are usually wired directly to the telephone lines, they are, almost invariably, owned and leased by the telephone company to the respective user.

2. Description of Prior Art

Many of these interface devices are complex units which are correspondingly high priced. In a number of instances, the operation to be performed does not require such highly sophisticated equipment and it is highly inefficient to have such gear perform relatively simple tasks. This is especially the case, where the leasing rate of such complicated data sets is very high, while the complexity of the task required is fairly simple.

BRIEF SUMMARY OF THE INVENTION

The present electroacoustical converter is a data communications device that makes use of telephone lines for the transmission of data, it will be referred to hereinafter as an Electroacoustic Converter. In particular, it performs a function similar to that of the so-called data sets owned and leased by the telephone company. However, this device acoustically couples the information to the telephone handset instead of having to be directly wired to the telephone lines. This feature makes it somewhat portable en route and permits use of the dial-up switched network. Frequency shift keying is used to present two discrete frequency tones for "ONE" – "ZERO" representation.

It is therefore an object of the present invention to provide an acoustical coupler capable of transmitting digital data over a standard telephone by means of audible tones.

It is still another object of the present invention to provide a device capable of coupling a terminal machine, such as, for example, a teletypewriter, with a data processing system at a distant location, using ordinary dial-up, voice-grade telephone lines.

It is still a further object of the present invention to provide a converter which receives electrical pulses, in the nature of binary notation, at its input and converts them to audible tones at its output.

These and other objects of the invention will become obvious and many additional advantages will be more readily appreciated when the following detailed description is considered in conjunction with the accompanying drawings.

In the drawings:

FIG. 1 includes FIGS. 1A and 1B, and is a pictorial diagram of the data transmission system;

FIG. 2 includes FIGS. 2A and 2B and shows the input and output signals of a data set;

Figure 5A:
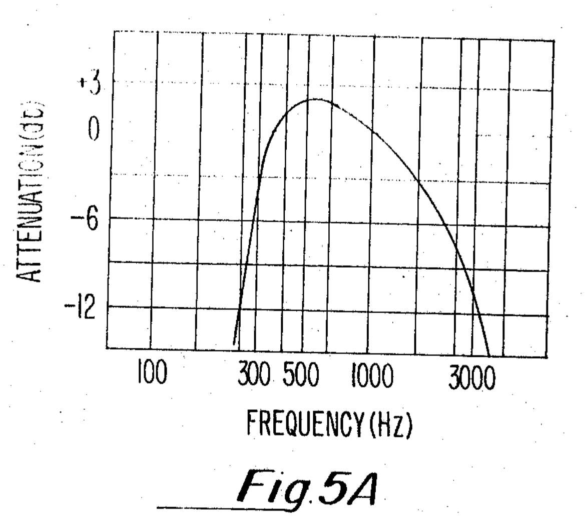
Figure 5B:
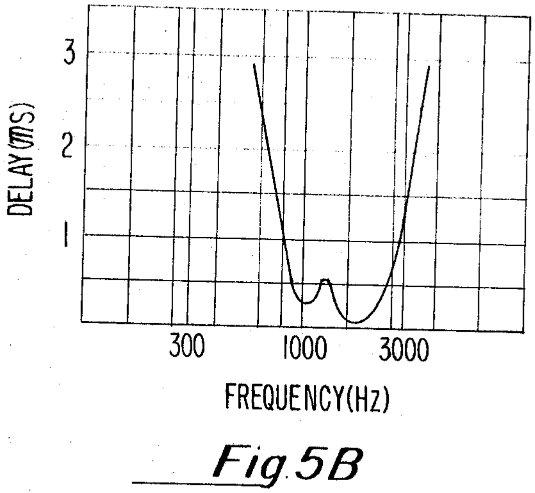
Figure 6:
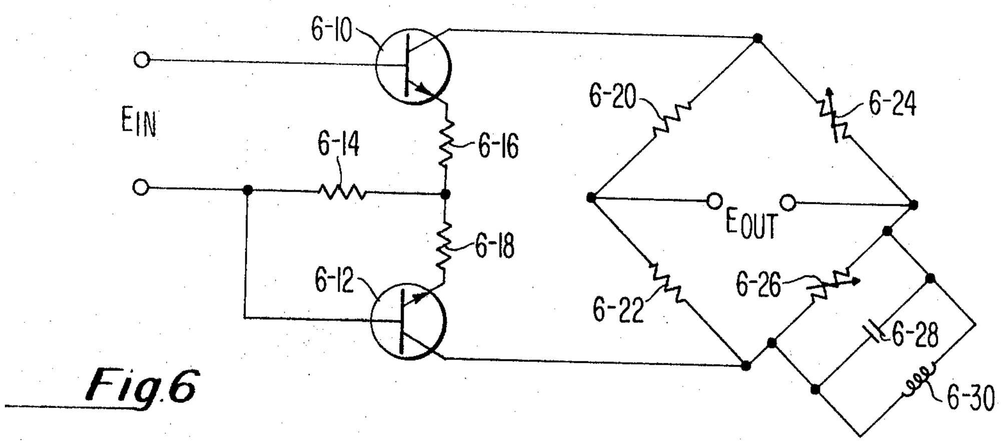
Figure 7A:
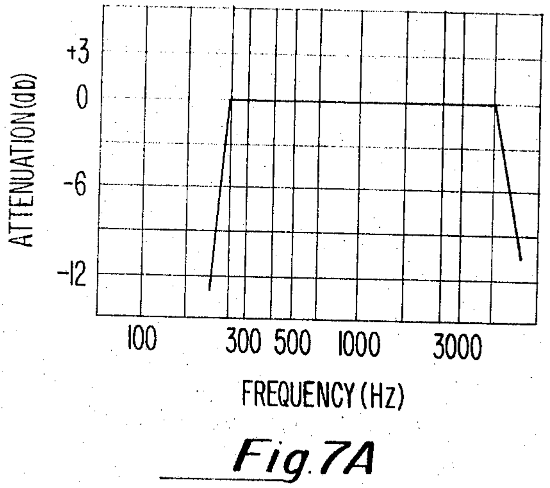
Figure 7B:
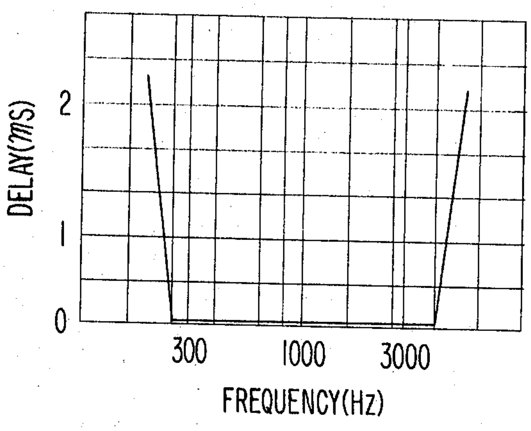
Figure 8:
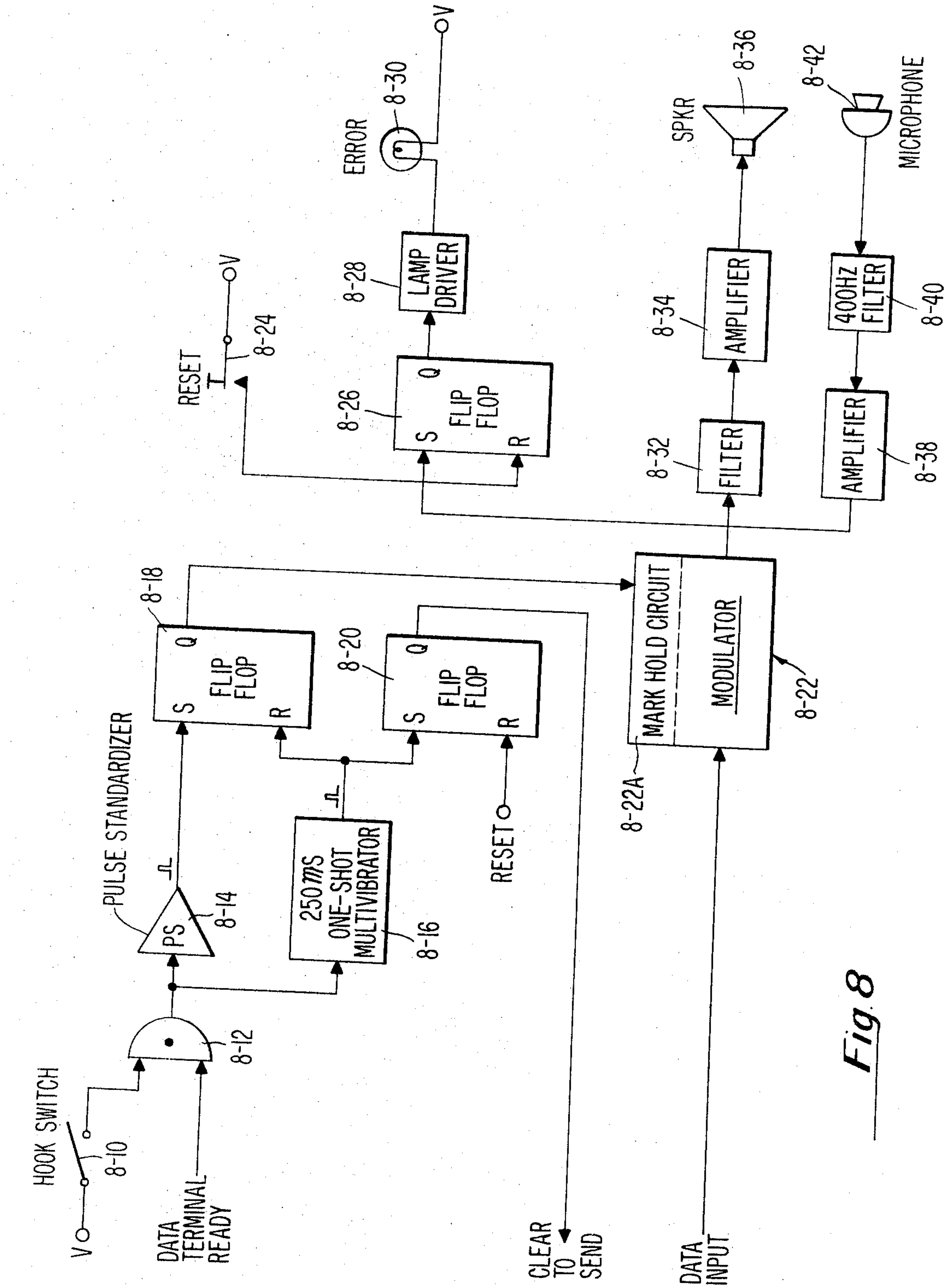
Figure 9:
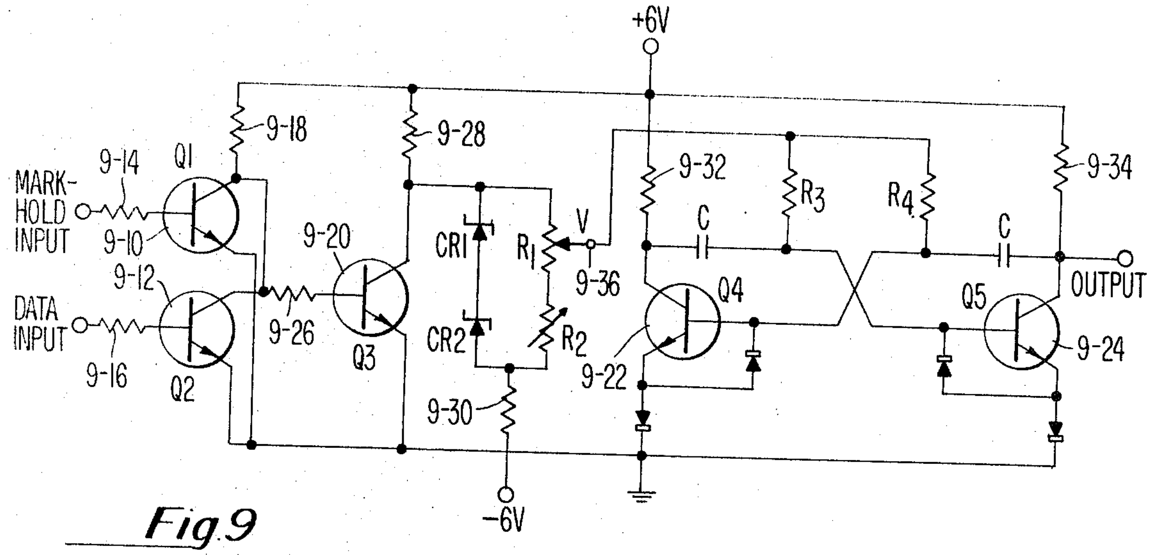
Figure 10:
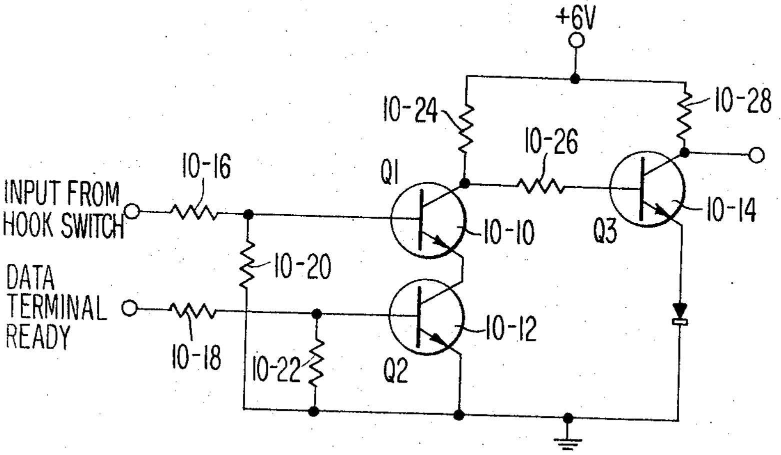
Figure 11:
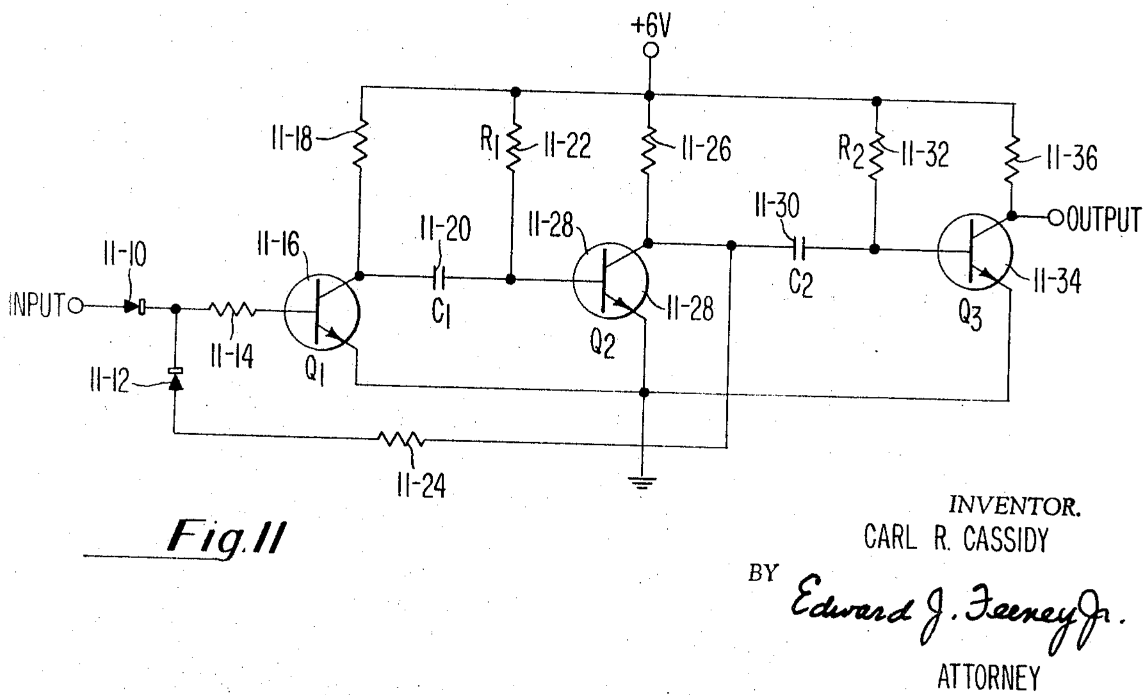
Figure 12:
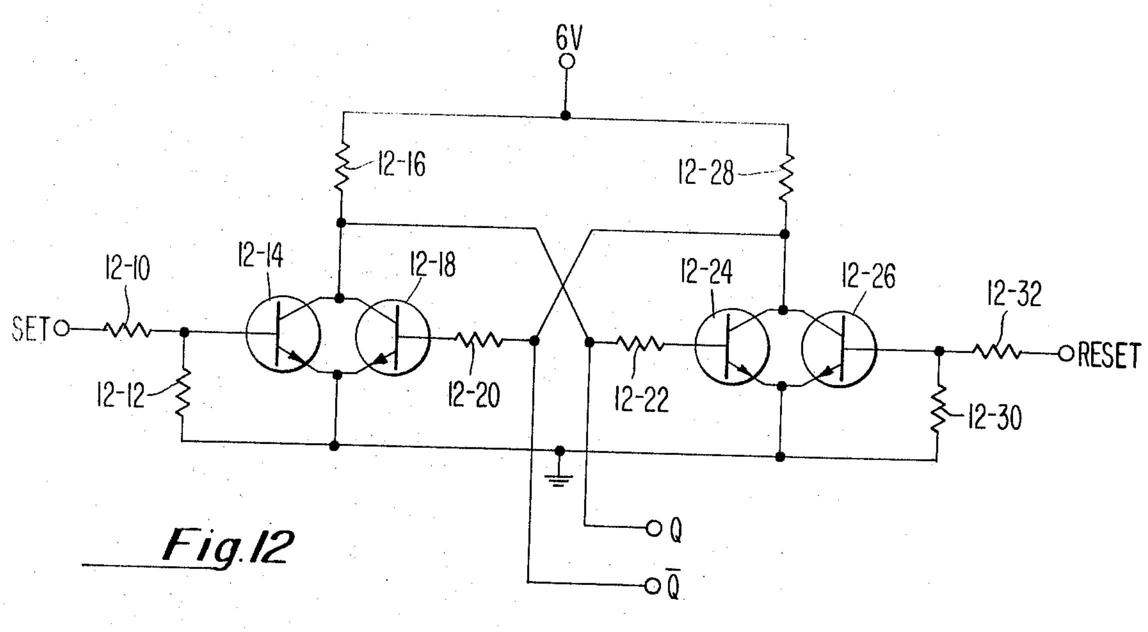
Figure 13:
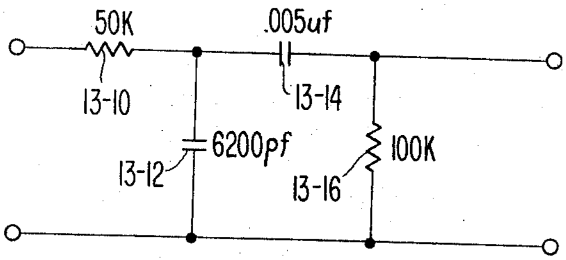
Figure 14:
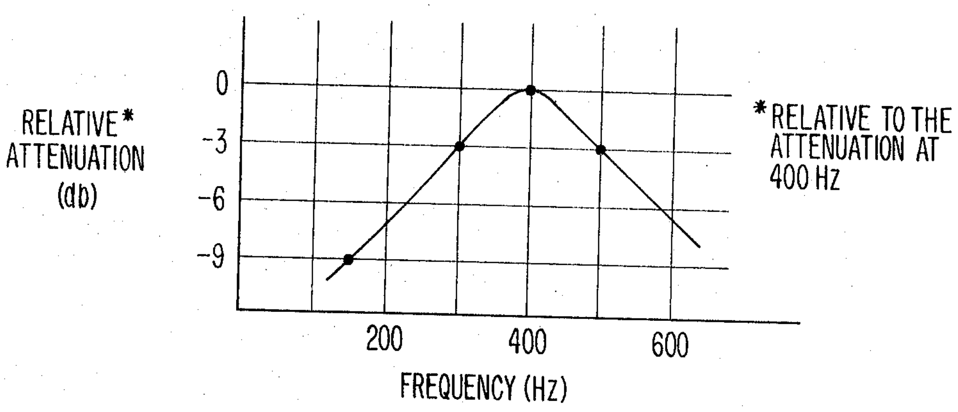

FIG. 5 includes FIGS. 5A and 5B and illustrates the electrical characteristics of the telephone channel;

FIG. 6 is a simplified schematic diagram showing a section of the equalizer circuit;

FIG. 7 includes FIGS. 7A and 7B and illustrates the ideal electrical characteristics of a telephone channel;

FIG. 8 is a functional logic diagram of the electroacoustical converter;

FIG. 9 is a schematic diagram of a modulator circuit such as might be used in this converter;

FIG. 10 schematically illustrates a two input AND gate that might be utilized;

FIG. 11 is a schematic diagram of a one shot multivibrator circuit that may be used in the converter of FIG. 8;

FIG. 12 is a schematic diagram of a representative flip-flop circuit for the same converter;

FIG. 13 is a schematic diagram of the required error alarm filter circuit used in this circuit, and FIG. 14 is a graphical illustration of the attenuation plot of the filter circuit of FIG. 13.

DETAILED DESCRIPTION, INCLUDING THE PREFERRED EMBODIMENT

The present device enables the transmission of digital data over a standard telephone by means of audible tones. It can be used to couple a terminal machine, such as a teletypewriter, with a computer at a distant location, using ordinary dial-up voice grade telephone lines. It can be variously described as a coupler, converter, or adapter. Functionally, it receives electrical pulses at its input, and converts them to audible tones at its output. It will be called an Electrocoustic Converter, or just converter in this description.

The converter is similar in nature to the telephone company's Data Set, and can be used in place of it in many low speed applications. A brief description of the Data Set will be given, and a comparison made between it and the Electroacoustic Converter.

In addition to the teletypewriter, the converter can also be used with magnetic tape readers, punched paper tape readers, or any device that emits bilevel signals in a serial mode.

Figure 1A:
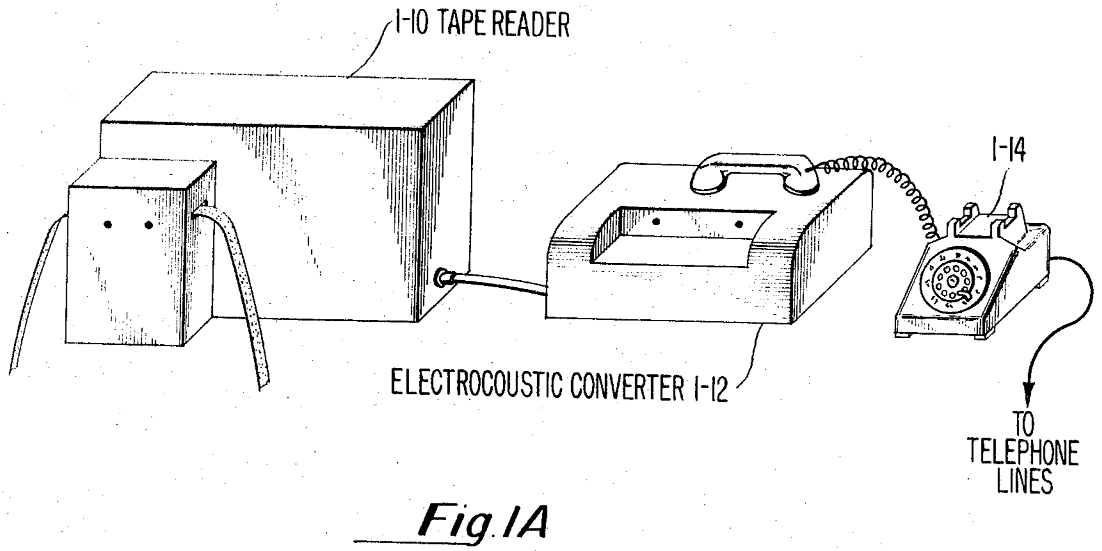
Figure 1B:
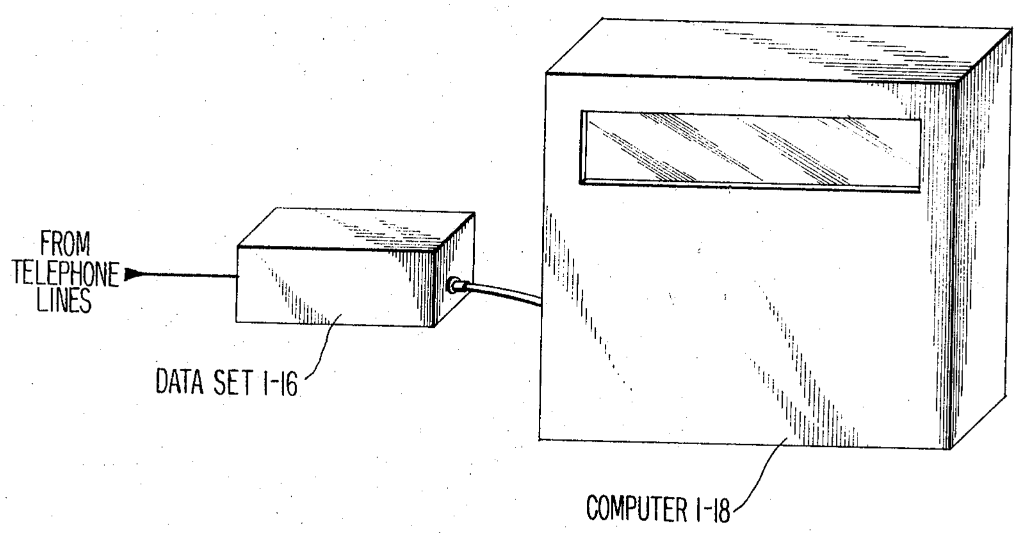

As an example, to illustrate a possible application, consider the pictorial diagram shown in FIGS. 1A and 1B. Consider next a large company that has many salesmen selling a variety of their products in various states throughout the country. At the end of each day each salesman sends his orders to a company central office where they will be processed, and the merchandise mailed out to the customers. Since it is a large company, they have a computer to handle their sales analysis, inventory control, payroll, etc.

Each salesman has at his disposal a portable paper tape punch, a punched paper tape reader, and an Electroacoustical Converter. At the end of each day each salesman prepares a punched paper tape with his respective sales information for that day. Salesman "A" places his tape in the reader shown in FIG. 1A and then at a set time that evening he dials the computer's phone number.

The company has arranged for their computer to be standing by each evening starting at 8:00 PM to receive sales orders from the phone line, FIG. 1B. A Data Set, leased from the telephone company, connects the computer to the telephone line. When the salesman's call comes in the Data Set "answers" automatically. The salesman then places his telephone handset on the converter, and starts the paper tape reader. The previously prepared punched paper tape is driven through the reader. The electrical pulses from the reader are converted into audible tones by the converter to be "heard" by the telephone. The telephone instrument converts the tones to electrical frequencies which are transmitted over the telephone lines to the Data Set, which in turn, converts the signals back to electrical pulses compatible with the computer input.

In this manner, the data is transmitted quickly and accurately as the tape feeds through the reader. When finished, the salesman places the telephone handset back on the instrument terminating the call, and the computer proceeds with its normal routine until salesman "B" calls.

The preceding example is a simplified illustration of the procedure. Not mentioned, for the sake of brevity, is the means for "channel establishment," "handshaking," and transmit-error alarm. These functions are also carried out by the Electrocoustic Converter.

There is an ever expanding need for transmission of data between distant locations, and the obvious ready-made network for doing this is the common-carrier telephone lines. While it is well known that the telephone companies are very restrictive concerning the use of their equipment, recent events would make it appear that they are now going to be more permissive in this regard.

Figure 2A:
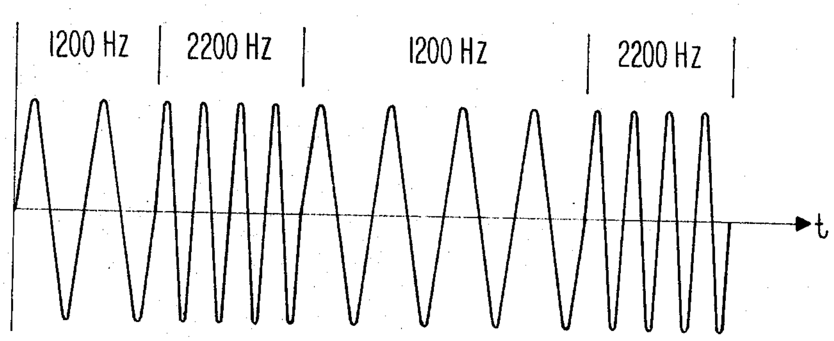
Figure 2B:
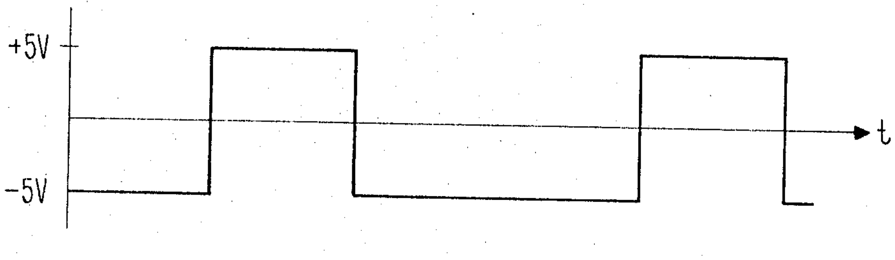

The Data Set (also called a modem for modulator/demodulator), is a device leased from the telephone company for the same general purpose as the present device. As illustrated in FIG. 2, the Data Set also converts electrical oscillations (discrete frequencies) to electrical voltage levels, (digital signals). However, it can perform in both directions (duplex), either at separate times (half duplex), or simultaneously (full duplex). Thus, for example, in the full duplex mode of operation it can be receiving data from the telephone line, and passing it along to an input peripheral device of the computer at the same time that it is transmitting other data into the telephone line that is receiving from an output peripheral device of the same computer.

As mentioned previously, Data Sets can automatically answer an incoming call. They can also place calls automatically, under control of the computer, and "hang up" when the call is terminated. It is obvious from this brief description that the Data Set is a very sophisticated piece of equipment and the lease rate set by the telephone company is commensurate with this level of complexity.

The transmission speed of Data Sets is measured in bits per second (BPS). Two Data Sets commonly used with data processing are known generally as the 103 and 202. The essential differences between them are: the 103 Data Set is a low speed (200 BPS) unit, but it can operate full duplex, whereas the 202 device is a high speed (1,800 BPS) unit, but it can operate in half duplex mode only.

Since the 202 operates in half duplex mode, it uses only two frequencies. They are 1,200 Hz for MARK and 2,200 Hz for SPACE. Therefore, using the illustration of FIG. 2, in the TRANSMIT mode as the input voltage level switches between −5 volts DC and +5 volts DC, the output to the telephone lines will switch between 1,200 Hz and 2,200 Hz. Conversely, in the RECEIVE mode, the Data Set electrically "turns around," responding to these two frequencies now coming from the telephone line as an input, and providing two respective output voltages.

The 103 Data Set, in order to be capable of operation in full duplex mode, uses two pair of frequencies; one pair for transmitting ONES and ZEROES into the telephone lines, and another pair for receiving ONES and ZEROES from the telephone lines. The frequencies used are 1,070 Hz (MARK 1)/ 1,270 Hz (SPACE 1), and 2,025 Hz (MARK 2)/ 2,225 Hz (SPACE 2).

The following tables table lists the pertinent characteristics of the Electroacoustic Converter and the Data Set in comparative form. It is readily seen from the table that the converter has many advantages over the Data Set, and can replace it where high speed or full duplex operation are not requirements.

| Electroacoustic Converter | Data Set |
|---|---|
| Inexpensive | Expensive |
| Modest Design | Complex Design |
| Easy to Service | More Difficult to Service |
| Portable in Nature | Used in fixed Location |
| Owned by User | Must be Leased |
| Could Be Built Into the Terminal Machine | Must be Maintained Separate from the Terminal Machine |
| Half Duplex Only | Full Duplex Operation |

EIA Standard RS–232–B is an industry approved standard for the interface between data processing terminal equipment and data communications equipment. It was established by a committee set up under the auspices of The Electronic Industries Association, and it defines the means of exchanging control signals and binary serialized data signals between these equipments. The need for such a standard arose because of the wide variety of equipment that must communicate with each other, and by the fact that these equipments are made by many different manufacturers. The standard is pertinent to this invention description because the invention conforms to this interface specification.

The following are defined as standard signal lines by EIA Standard RS–232–B:

| | |
|---|---|
| AA | Protective Ground |
| AB | Signal Ground |
| BA | Transmitted Data |
| BB | Received Data |
| CA | Request to Send |
| CB | Clear to Send |
| CC | Data Set Ready |
| CD | Data Terminal Ready |
| CE | Ring Indicator |
| CF | Data Carrier Detector |
| DA | Transmitted Signal Element Timing |

Figure 3:
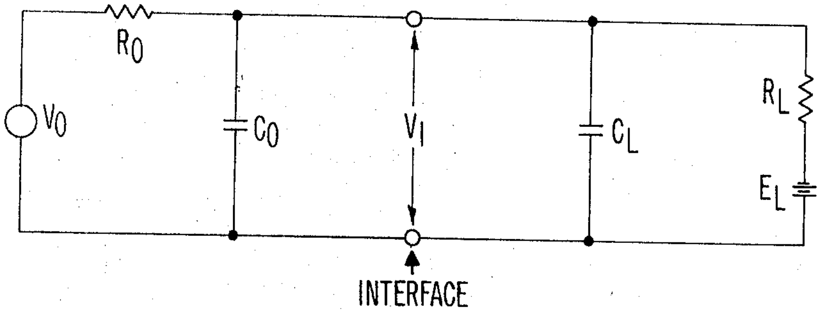
FIG. 3 is a schematic diagram illustrating the equivalent circuit of the interface.
Figure 4:
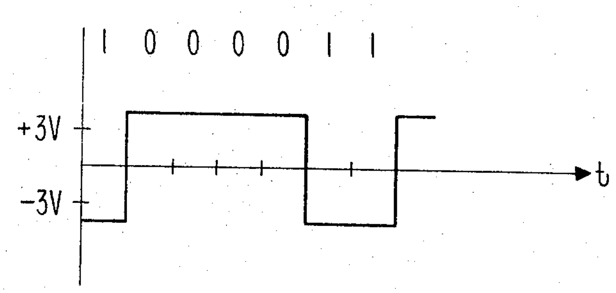
FIG. 4 is a representative pulse of an existing standard showing a sample letter "C"

The symbols used with the equivalent circuit of FIG. 3 are defined as follows:

$V_o$ is the open-circuit generator voltage
$V_1$ is the interface voltage
$R_o$ is the generator internal impedance
$R_1$ is the load impedance
$E_1$ is the load open-circuit voltage (bias)
$C_1$ is the total effective load capacitance
$C_o$ is the capacitance associated with the generator Specifications on the Interface Equivalent Circuit:

1. $V_o$ shall not be greater than $\pm$ 25 volts.
2. When the interface is short-circuited, the circuits shall not be damaged and the short-circuited current shall not be greater than one-half ampere.
3. $R_o$ is not otherwise specified, except that, when $R_1$ is 3,000 ohms and $E_1$ is zero, $V_1$ shall not be less than $\pm$ 5 volts.
4. $E_1$ shall not be greater than $\pm$ 2 volts.
5. $R_1$ shall not be less than 3,000 ohms or more than 7,000 ohms.
6. $C_1$ shall not be greater than 2,500 picofarads.
7. The circuitry that receives signals from an interchange shall recognize the binary signal when $V_1$ equals $\pm$ 3 volts. The signal condition is not defined when $V_1$ is in the range between +3 and −3 volts.

The telephone channel has a band pass frequency range from 300 to 3,000 Hz. This is shown graphically in FIG. 5A. This is adequate for voice transmission, but introduces certain constraints on the transmission of digital signals. Since the frequency response is not flat, and because data is transmitted by frequency-shift-keying (FSK), the signal encounters amplitude distortion and envelope delay (envelope delay is defined as the rate of change of phase with frequency). A graph of the delay phenomenon is shown in FIG. 5B. The latter phenomenon causes overlapping of ONES and ZEROES, which places a further constraint on transmission bit rate.

To offset the adverse frequency response effects, the circuit device called an "equalizer," shown in FIG. 6, was developed for use with data transmission equipment. These devices insert a variable amount of delay and amplitude correction over a small range of frequencies in an effort to compensate for the actual effect of the channel. Several equalizers can be distributed over the band of interest. The output signal is taken across a resistive bridge comprised of a pair of fixed resistors 6–20 and 6–22 and a pair of variable resistors 6–24 and 6–26. The potentiometer 6–26 has a capacitor 6–28 and an inductor 6–30 connected in parallel with it. The input to the equalizer is applied to a pair of transistors 6–10 and 6–12. Ideally, the end result of this line conditioning would be a flat amplitude response characteristic shown in FIG. 7A and a constant phase delay as shown in FIG. 7B.

Data communications equipment must also contend with "echo suppressors" that the telephone companies use on the lines. These devices are used to eliminate echoes that would normally occur on long haul lines (over 300 miles) due to electrical reflections. They behave like diodes in that they permit voice transmission in only one direction at a time. The direction is determined by who starts talking first at any instant of time. The echo suppressors position themselves either way in approximately 50 milliseconds, which is a fast enough turn-around time that their presence goes undetected by the phone users.

When the use of the telephone lines for data transmission started, it became necessary to design a method for disabling the echo suppressors in order to permit full duplex mode of operation. An "echo suppressor disabler circuit," not shown, was developed to fill this need. This circuit responds to a 2,025 Hz tone or electrical oscillation and proceeds to short circuit the echo suppressors. The absence of all signals on the line for a period of 100 milliseconds will cause the suppressors to be restored.

Therefore, to condition the telephone line for data transmission (effect Channel Establishment) the equipment using the telephone line must first transmit a 2,025 Hz signal for 300 milliseconds to disable the echo suppressors. Following this, there must be some signal continuously present on the line to hold them disabled. It is customary to maintain a MARK signal on the line between segments of data.

The input interface of the Electroacoustic Converter conforms with the EIA RS–232–B standards. The data input line senses a voltage level greater than +3 volts as a binary ZERO (SPACE) and a voltage level less than −3 volts as a binary ONE (MARK). Functionally, the converter responds to these two voltage levels with an output of two audible tones. The frequencies used, of course, must be compatible with the Data Set in use at the computer. For instance, if a 103 Data Set is in use at the computer, the converter must be designed to transmit a 2,025 Hz tone for a ONE and a 2,225 Hz tone for a ZERO.

The converter must also contain some sequential logic to participate in a "handshaking" procedure with the Data Set before data transmission can begin. This will be illustrated with the following example of an actual transmission in conjunction with FIG. 8.

Consider again the salesman who is to transmit his day's orders to the computer. He has punched the paper tape with his message, starting with a special code number that identifies him, and also serves as a pass-word to the computer. He has followed this with the sales ordering information, and then ends with an END-OF-MESSAGE code. The tape has been placed in the tape reader 1–10 as shown in FIG. 1, which has been turned on and is sending a TERMINAL READY signal to the converter.

He then dials the telephone number of the computer. If not busy with another call, the computer's Data Set will answer with a 2,025 Hz tone. This is the indication to the caller that he is now connected to the computer and also serves to excite the echo suppressor disabler circuits. The salesman will then place the handset of his telephone on the converter. The latter has a foam rubber receptacle to receive the handset and shut out noise from the room. A hook switch 8–10, actuated by the handset, starts the logic in the converter to turn on a 2,225 Hz tone which is transmitted back to the Data Set. This is accomplished as follows. The AND gate 8–12 simultaneously provides an output signal to the pulse standardizer 8–14 and the one shot multivibrator 8–16. The pulse output from standardizer 8–14 is applied to set the flip-flop 8–18, which in turn causes the MARK-HOLD circuit 8–22A to place a MARK signal on the line. A short time later (actually 250 milliseconds) the one shot multivibrator resets flip-flop 8–18 and sets flip-flop 8–20 which, in turn, provides a CLEAR TO SEND signal to the computer. The data input to the modulator 8–22 then proceeds to cause a voltage controlled multivibrator to shift between a first and a second frequency (This is more clearly shown in FIG. 9). The output from the modulator 8–22 is filtered 8–32 and amplified 8–34 for use by speaker 8–36 and subsequent acoustical coupling to the standard telephone.

The Data Set has been waiting for the authenticating response and will wait only 30 seconds for it. If it fails to receive it, the Data Set will "hang up" so as not to become involved in an unauthentic call.

Having received the 2,225Hz signal, the Data Set will discontinue its transmission of the 2,025 Hz tone and stand by to receive the incoming message. The converter will sustain the 2,225 Hz tone for a period of 250 milliseconds by means of the one shot multivibrator 8–16 operating into the MARK-HOLD circuit 8–22A. The converter then places the tone circuits under control of the DATA INPUT line and turns on the CLEAR TO SEND line from the flip-flop 8–20 to the paper tape reader.

The tape reader will proceed to read the tape, and send the code in serial fashion to the input line of the converter. The converter will, in turn, generate MARK and SPACE tones accordingly, at its output speaker 8–36. The computer will check the salesman's pass-word number (hanging up if it is erroneous) and do parity checking throughout the entire transmission. If a parity error is detected, the computer will cause the Data Set to send back a 400 Hz signal (hence the need for disabling the echo suppressors). This signal is picked up by the converter's microphone 8–42 as a 400 Hz tone. The error alarm circuit, including the filter 8–40, the amplifier 8–38, the flip-flop 8–26 in the converter will respond to this tone and light an error indicator 8–30 on the converter. If this occurs, the salesman will stop the reader, reset the tape to the starting point, reset the error alarm circuit 8–24, and re-transmit the message. It is not too uncommon for noise on the telephone lines to cause an occasional error during data transmission.

When the tape has fed through the reader, the salesman will remove the telephone handset from the converter and place it on the instrument terminating the call. The Data Set, meanwhile detecting the loss of both the 2,025 and 2,225 Hz tones, automatically hangs up. The telephone line, detecting the absence of signal, resets the echo suppressors.

The electrical circuits used in the converter of FIG. 8 are not complex. Present day silicon transistors provide good noise immunity due to the relatively high base to emitter voltage required to turn them on. This feature, coupled with their low collector to emitter saturation voltage, low collector to base leakage, and excellent stability with temperature change, makes it possible to design with less components than when using germanium transistors.

Silicon transistors are available in low cost epoxy encased units. Also, silicon integrated circuit components are available at slightly higher cost. These contain several logic circuits available in one transistor or in a 14 pin dual-in-line package.

The critical components in the electrical circuits are the frequency controlling capacitors and resistors in the modulator and in the filter. The MARK and SPACE frequencies must be maintained within an accuracy compatible with the Data Set at the computer site. Therefore, high quality, close tolerance, stable capacitors and resistors must be used in the critical areas. These must be discrete components rather than integrated circuits.

The essential parts of the modulator circuit are shown in FIG. 9. It is a voltage controlled astable (free running) multivibrator. The frequency is controlled by voltage V, at the arm of potentiometer $R_1$, 9–36, capacitors C, and resistors $R_3$ and $R_4$; it is shifted between 2,025 Hz and 2,225 Hz by transistor $Q_3$, 9–20. When 9–20 is in the OFF state, the voltage at arm 9–36 is high and the output frequency is 2,225 Hz (SPACE). In this state the voltage is determined by Zener diodes CR1 and CR2 and the voltage divider formed by $R_1$ and $R_2$. Conversely, when transistor 9–20 is in the ON state, the voltage at arm 9–36 is low and the output frequency is 2,025 Hz (MARK). In this state the voltage is determined by Zener diode CR2 and the voltage divider. Notice that $R_1$ and $R_2$ are adjustable for setting the frequencies. The Zener diodes CR1 and CR2 provide frequency stability with changes in supply voltage. This is especially important with battery operated converters.

FIG. 10 shows in detail the two-input AND gate circuit, shown generally in FIG. 8, 8–12. Thus, both inputs must be high (DATA TERMINAL READY and the HOOK SWITCH closed) before the output will go high. This is accomplished by the switching of $Q_1$ 10—10 and $Q_2$ 10–12 simultaneously to cause $Q_3$ 10–14 to switch.

FIG. 11 shows the one shot multivibrator circuit. When the input goes high, transistors $Q_1$, 11–16 and $Q_2$, 11–28 will switch state for a period of 250 milliseconds and then reset to their original states. At the instant transistor 11–16 resets, transistor 11–34 emits a short positive pulse at the output. The result is a pulse output that occurs 250 milliseconds after the input goes high. The delay period is determined by capacitor Cl, 11–20 and resistor $R_1$, 11–22 while the output pulse width is determined by capacitor C2, 11–30 and resistor $R_2$, 11–32.

FIG. 12 shows the flip-flop (bistable multivibrator) circuit. It is a typical circuit with SET and RESET inputs. The use of silicon transistors 12–14, 12–18, 12–24 and 12–26 makes possible the simple biasing circuits used.

FIG. 13 shows a typical filter circuit. The filter plays an important role in the converter. It must pass the frequencies of interest and block unwanted frequencies and harmonics. The component values given for resistors 13–10 and 13–16 as well as for capacitors 13–12 and 13–14 are merely approximate values and other configurations using similar values may be equally effective.

FIG. 14 is a frequency plot of this filter showing its attenuation characteristics relative to 400 Hz.

What has been shown and described herein is an Electroacoustical Converter with many applications in the business and data processing industries. It is small in size and complexity, and inexpensive when compared to the Data Set. The input conforms to communications industry standards, which permits it to be connected as-is to a great variety of terminal equipment.

The converter does have limitations in speed, and can be operated in half duplex mode only. However, there are many data communications devices that fall into this class, such as the teletypewriter (150 BPS), and the paper tape reader (300 BPS).

The converter is used with any standard telephone on a standard dial-up switched network and consequently it is not necessary to lease an expensive, dedicated line. It must also be readily realized that many other configurations of this device may be practiced in the light of the above teachings. It is therefore understood that the present invention is to be limited only by the following claims.

What is claimed is:

1. An electroacoustic converter for the transmitting of digital data over a standard telephone line to a central data processing system comprising means for converting a sequence of bilevel electrical signals to a first and a second audible signal, said converting means including a modulator means having a voltage controlled multivibrator with a means for maintaining said multivibrator in a first audible frequency output condition for a predetermined period of time, said converting means further including a pulse standardizing means for providing a pulse output signal in response to a fixed level input signal and a first flip-flop circuit, having a set and a reset input connected thereto with the output of said pulse standardizing means connected to the set input of said first flip-flop circuit and the output of said first flip-flop circuit connected to said modulator maintaining means for holding said voltage controlled multivibrator in said first output condition for said predetermined period of time.

2. The electroacoustic converter as set forth in claim 1 including still further a one shot multivibrator circuit and a second flip-flop circuit having a set and a reset input connected thereto with the output of said one shot multivibrator circuit connected to the set input of said second flip-flop, said one shot multivibrator circuit also connected to the reset input of said first flip-flop wherein the activation of said one shot multivibrator causes said first flip-flop circuit to be placed in a reset condition while simultaneously placing said second flip-flop circuit in a set condition.

3. An electroacoustic converter for the transmitting of digital data over a standard telephone, via a telephone exchange to a central data processing system comprising a modulator means capable of providing a first audible output frequency called a MARK and a second audible output frequency called a SPACE in response to a bilevel input signal to said modulator, a MARK HOLDING means included with said modulator for maintaining said modulator output frequency in a MARK condition for a predetermined period of time a first flip-flop having a set and a reset input and an output means, the output of a first flip-flop circuit connected to said MARK HOLDING means to activate the same, a pulse standardizing means connected to the set input of said first flip-flop to cause said first flip-flop to be placed in a set condition, a two input AND gate connected to the input of said pulse standardizing means to activate said pulse standardizing means upon simultaneous receipt of a voltage level and a data terminal ready signal applied at the input of said AND gate, a one shot multivibrator with its input also connected to the output of said AND gate and its output connected to the reset input of said first flip-flop wherein the simultaneous activation of said pulse standardizer and said one shot multivibrator causes said first flip-flop to be set by said pulse standardizer and subsequently reset by said one shot multivibrator at a fixed predetermined period.

4. The electroacoustic converter as set forth in claim 3 wherein a second flip-flop, having a reset and a set input means, is connected to said one shot multivibrator with the output of said one shot multivibrator commonly connected to the reset input of said first and set input of said second flip-flops causing said second flip-flop to be set by the same signal that resets said first flip-flop to thereby provide from said second flip-flop a CLEAR TO SEND signal to said central data processing system.

5. The electroacoustic converter as set forth in claim 4 wherein an error indication means is included therein.

6. The electroacoustic converter as set forth in claim 5 wherein said error indication means includes a band-pass filter, an amplifier connected thereto, a flip-flop circuit connected with its set input to be set upon the receipt of a signal from said amplifier, a lamp driver means with an error indicating lamp connected to the output of said flip-flop to be illuminated by the activation of said lamp driving means upon the setting of said flip-flop circuit.

7. The electroacoustic converter as set forth in claim 6 wherein said error indicating means further includes a manual resetting means to reset said flip-flop circuit.

* * * * *